US008046772B2

(12) United States Patent
Upton

(10) Patent No.: US 8,046,772 B2
(45) Date of Patent: *Oct. 25, 2011

(54) SYSTEM AND METHOD FOR ENTERPRISE APPLICATION INTERACTIONS

(75) Inventor: Mitch Upton, Highlands Ranch, CO (US)

(73) Assignee: Oracle International Corporation, Redwood Shores, CA (US)

( * ) Notice: Subject to any disclaimer, the term of this patent is extended or adjusted under 35 U.S.C. 154(b) by 1176 days.

This patent is subject to a terminal disclaimer.

(21) Appl. No.: 11/758,594

(22) Filed: Jun. 5, 2007

(65) Prior Publication Data

US 2007/0234371 A1 Oct. 4, 2007

Related U.S. Application Data

(63) Continuation of application No. 10/409,753, filed on Apr. 9, 2003, now Pat. No. 7,350,184.

(60) Provisional application No. 60/377,306, filed on May 2, 2002.

(51) Int. Cl.
G06F 13/00 (2006.01)
G06F 9/44 (2006.01)

(52) U.S. Cl. ........................................ 719/311; 717/100

(58) Field of Classification Search .................. 719/318; 717/116, 118; 715/221
See application file for complete search history.

(56) References Cited

U.S. PATENT DOCUMENTS

| | | |
|---|---|---|
| 5,321,841 A | 6/1994 | East et al. |
| 5,748,975 A | 5/1998 | Van De Vanter |
| 5,801,958 A | 9/1998 | Dangelo et al. |
| 5,835,769 A | 11/1998 | Jervis et al. |
| 5,836,014 A | 11/1998 | Faiman |
| 5,862,327 A | 1/1999 | Kwang et al. |
| 5,867,822 A | 2/1999 | Sankar |
| 5,933,838 A | 8/1999 | Lomet |
| 5,950,010 A | 9/1999 | Hesse et al. |
| 5,961,593 A | 10/1999 | Gabber et al. |
| 5,966,535 A | 10/1999 | Benedikt et al. |
| 6,012,083 A | 1/2000 | Savitzky et al. |
| 6,023,722 A | 2/2000 | Colyer |

(Continued)

FOREIGN PATENT DOCUMENTS

WO 01/90884 A2 11/2001

OTHER PUBLICATIONS

Muller, "Event-Oriented Dynamic Adaptation of Workflows Model, Architecture, and Implementation," 2002, University of Leipzig, Germany, pp. i-viv, 1-342.

(Continued)

Primary Examiner — S. Sough
Assistant Examiner — Phuong Hoang
(74) Attorney, Agent, or Firm — Fliesler Meyer LLP

(57) ABSTRACT

An application view control can allow users of a software tool to interact with Enterprise applications using simple Java APIs. This can allow a user who is not an expert in the use of a given Enterprise system to utilize its capabilities in a manner a Java programmer can understand. A developer can invoke application view services both synchronously and asynchronously, and can subscribe to application view events. The developer can use simple Java objects in both the service and event cases. The developer need not understand XML, or the particular protocol or client API for the Enterprise application, such as an Enterprise Information System (EIS).

29 Claims, 4 Drawing Sheets

U.S. PATENT DOCUMENTS

| | | |
|---|---|---|
| 6,028,997 A | 2/2000 | Leymann et al. |
| 6,029,000 A | 2/2000 | Woolsey et al. |
| 6,044,217 A | 3/2000 | Brealy et al. |
| 6,067,548 A | 5/2000 | Cheng |
| 6,067,623 A | 5/2000 | Blakely et al. |
| 6,070,184 A | 5/2000 | Blount et al. |
| 6,085,030 A | 7/2000 | Whitehead et al. |
| 6,092,102 A | 7/2000 | Wagner |
| 6,119,149 A | 9/2000 | Notani |
| 6,141,686 A | 10/2000 | Jackowski et al. |
| 6,141,701 A | 10/2000 | Whitney |
| 6,148,336 A | 11/2000 | Thomas et al. |
| 6,185,734 B1 | 2/2001 | Saboff et al. |
| 6,212,546 B1 | 4/2001 | Starkovich et al. |
| 6,222,533 B1 | 4/2001 | Notani et al. |
| 6,226,675 B1 | 5/2001 | Meltzer et al. |
| 6,230,287 B1 | 5/2001 | Pinard et al. |
| 6,230,309 B1 | 5/2001 | Turner et al. |
| 6,237,135 B1 | 5/2001 | Timbol |
| 6,243,737 B1 | 6/2001 | Flanagan et al. |
| 6,282,711 B1 | 8/2001 | Halpern et al. |
| 6,292,932 B1 | 9/2001 | Baisley et al. |
| 6,292,933 B1 * | 9/2001 | Bahrs et al. .................... 717/107 |
| 6,324,681 B1 | 11/2001 | Sebesta et al. |
| 6,330,569 B1 | 12/2001 | Baisley et al. |
| 6,336,122 B1 | 1/2002 | Lee et al. |
| 6,338,064 B1 | 1/2002 | Ault et al. |
| 6,343,265 B1 | 1/2002 | Glebov et al. |
| 6,349,408 B1 | 2/2002 | Smith |
| 6,353,923 B1 | 3/2002 | Bogle et al. |
| 6,367,068 B1 | 4/2002 | Vaidyanathan et al. |
| 6,377,939 B1 | 4/2002 | Young |
| 6,393,605 B1 | 5/2002 | Loomans |
| 6,408,311 B1 | 6/2002 | Baisley et al. |
| 6,411,698 B1 | 6/2002 | Bauer et al. |
| 6,445,711 B1 | 9/2002 | Scheel et al. |
| 6,463,503 B1 | 10/2002 | Jones et al. |
| 6,549,949 B1 | 4/2003 | Bowman-Amuah |
| 6,560,636 B2 | 5/2003 | Cohen et al. |
| 6,560,769 B1 | 5/2003 | Moore et al. |
| 6,567,738 B2 | 5/2003 | Gopp et al. |
| 6,594,693 B1 | 7/2003 | Borwankar |
| 6,594,700 B1 | 7/2003 | Graham et al. |
| 6,604,198 B1 | 8/2003 | Beckman et al. |
| 6,643,652 B2 | 11/2003 | Helgeson et al. |
| 6,662,357 B1 | 12/2003 | Bowman-Amuah |
| 6,678,518 B2 | 1/2004 | Eerola |
| 6,687,702 B2 | 2/2004 | Vaitheeswaran et al. |
| 6,687,848 B1 | 2/2004 | Najmi |
| 6,721,740 B1 | 4/2004 | Skinner et al. |
| 6,721,779 B1 | 4/2004 | Maffeis |
| 6,732,237 B1 | 5/2004 | Jacobs et al. |
| 6,748,420 B1 | 6/2004 | Quatrano et al. |
| 6,757,689 B2 | 6/2004 | Battas et al. |
| 6,795,967 B1 | 9/2004 | Evans et al. |
| 6,802,000 B1 | 10/2004 | Greene et al. |
| 6,804,686 B1 | 10/2004 | Stone et al. |
| 6,832,238 B1 | 12/2004 | Sharma et al. |
| 6,836,883 B1 | 12/2004 | Abrams et al. |
| 6,847,981 B2 | 1/2005 | Song et al. |
| 6,850,979 B1 | 2/2005 | Saulpaugh et al. |
| 6,859,180 B1 | 2/2005 | Rivera |
| 6,889,244 B1 | 5/2005 | Gaither et al. |
| 6,915,519 B2 | 7/2005 | Williamson et al. |
| 6,918,084 B1 | 7/2005 | Slaughter et al. |
| 6,922,827 B2 | 7/2005 | Vasilik et al. |
| 6,959,307 B2 | 10/2005 | Apte |
| 6,963,914 B1 | 11/2005 | Breitbart et al. |
| 6,976,086 B2 | 12/2005 | Sadeghi et al. |
| 6,996,800 B2 | 2/2006 | Lucassen et al. |
| 7,027,997 B1 * | 4/2006 | Robinson et al. ................ 705/9 |
| 7,043,722 B2 | 5/2006 | Bau, III |
| 7,051,072 B2 | 5/2006 | Stewart et al. |
| 7,054,858 B2 | 5/2006 | Sutherland |
| 7,072,934 B2 | 7/2006 | Helgeson et al. |
| 7,073,167 B2 | 7/2006 | Iwashita |
| 7,076,772 B2 | 7/2006 | Zatloukal |
| 7,089,584 B1 | 8/2006 | Sharma |
| 7,107,578 B1 | 9/2006 | Alpern |
| 7,117,504 B2 | 10/2006 | Smith et al. |
| 7,127,704 B2 | 10/2006 | Van De Vanter et al. |
| 7,155,705 B1 | 12/2006 | Hershberg et al. |
| 7,165,041 B1 | 1/2007 | Guheen et al. |
| 7,181,731 B2 | 2/2007 | Pace et al. |
| 7,260,599 B2 | 8/2007 | Bauch et al. |
| 7,260,818 B1 | 8/2007 | Iterum et al. |
| 7,350,184 B2 * | 3/2008 | Upton ........................... 717/100 |
| 7,584,473 B2 * | 9/2009 | Forin et al. .................... 718/100 |
| 2002/0004848 A1 | 1/2002 | Sudarshan et al. |
| 2002/0010781 A1 | 1/2002 | Tuatini |
| 2002/0010803 A1 | 1/2002 | Oberstein et al. |
| 2002/0016759 A1 | 2/2002 | Macready et al. |
| 2002/0049788 A1 | 4/2002 | Lipkin et al. |
| 2002/0073080 A1 | 6/2002 | Lipkin |
| 2002/0073236 A1 | 6/2002 | Helgeson et al. |
| 2002/0078365 A1 | 6/2002 | Burnett et al. |
| 2002/0083075 A1 | 6/2002 | Brummel et al. |
| 2002/0116454 A1 | 8/2002 | Dyla et al. |
| 2002/0120685 A1 | 8/2002 | Srivastava et al. |
| 2002/0152106 A1 | 10/2002 | Stoxen et al. |
| 2002/0165936 A1 | 11/2002 | Alston et al. |
| 2002/0169644 A1 | 11/2002 | Greene |
| 2002/0174178 A1 | 11/2002 | Stawikowski |
| 2002/0174241 A1 | 11/2002 | Beged-Dov et al. |
| 2002/0184610 A1 * | 12/2002 | Chong et al. .................. 717/109 |
| 2002/0188486 A1 | 12/2002 | Gil et al. |
| 2002/0194267 A1 | 12/2002 | Flesner et al. |
| 2002/0194495 A1 | 12/2002 | Gladstone et al. |
| 2003/0004746 A1 | 1/2003 | Kheirolomoom et al. |
| 2003/0005181 A1 | 1/2003 | Bau et al. |
| 2003/0014439 A1 | 1/2003 | Boughannam |
| 2003/0018665 A1 | 1/2003 | Dovin et al. |
| 2003/0018963 A1 | 1/2003 | Ashworth et al. |
| 2003/0023957 A1 | 1/2003 | Bau, III et al. |
| 2003/0028364 A1 | 2/2003 | Chan et al. |
| 2003/0041198 A1 | 2/2003 | Exton et al. |
| 2003/0043191 A1 | 3/2003 | Tinsley et al. |
| 2003/0046266 A1 | 3/2003 | Mullins et al. |
| 2003/0055868 A1 | 3/2003 | Fletcher et al. |
| 2003/0055878 A1 | 3/2003 | Fletcher et al. |
| 2003/0074217 A1 | 4/2003 | Beisiegel et al. |
| 2003/0084203 A1 | 5/2003 | Yoshida et al. |
| 2003/0110117 A1 | 6/2003 | Saidenberg et al. |
| 2003/0110446 A1 | 6/2003 | Nemer |
| 2003/0126136 A1 | 7/2003 | Omoigui |
| 2003/0149791 A1 | 8/2003 | Kane et al. |
| 2003/0167358 A1 | 9/2003 | Marvin et al. |
| 2003/0196168 A1 | 10/2003 | Hu |
| 2003/0233631 A1 | 12/2003 | Curry et al. |
| 2004/0019645 A1 | 1/2004 | Goodman et al. |
| 2004/0068568 A1 | 4/2004 | Griffin et al. |
| 2004/0103406 A1 | 5/2004 | Patel |
| 2004/0133660 A1 | 7/2004 | Junghuber et al. |
| 2004/0148336 A1 | 7/2004 | Hubbard et al. |
| 2004/0204976 A1 | 10/2004 | Oyama et al. |
| 2004/0216086 A1 | 10/2004 | Bau |
| 2004/0225995 A1 | 11/2004 | Marvin et al. |
| 2004/0260715 A1 | 12/2004 | Mongeon et al. |
| 2006/0206856 A1 | 9/2006 | Breeden et al. |

OTHER PUBLICATIONS

Peltz, "Web Service Orchestration," HP, Jan. 2003, Hewlett Packard Co., pp. 1-20.

Ort et al., Java Architecture for XML Binding (JAXB), Mar. 2003, Java-Sun, pp. 1-14.

Wikepedia, Java Architecture for XML Binding (JAXB), Oct. 2007, pp. 1-3.

Shannon, Java 2 Platform Enterprise Edition Specification, Oct. 20, 2000, v1.3, chapters 1-11.

* cited by examiner

SYSTEM AND METHOD FOR ENTERPRISE APPLICATION INTERACTIONS

CLAIM OF PRIORITY

This application is a continuation of U.S. patent application Ser. No. 10/409,753 entitled "System and Method for Enterprise Application Interactions," (now U.S. Pat. No. 7,350,184) filed Apr. 9, 2003, which claims the benefit of US Provisional Patent Application No. 60/377,306, filed May 2, 2002.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. patent application Ser. No. 7,493,628 entitled "Shared Common Connection Factory," by Timothy Potter et al., issued Feb. 17, 2009.

U.S. patent application Ser. No. 7,484,224 entitled "Adapter Deployment Without Recycle," by Timothy Potter et al., issued Jan. 27, 2009.

U.S. Pat. No. 7,165,249 entitled "System and Methods for Modular Component Deployment," by Timothy Potter et al., issued Jan. 16, 2007.

U.S. Pat. No. 7,080,092 entitled "Application View Component for System Integration," by Mitch Upton et al., issued Jul. 18, 2006.

U.S. patent application Ser. No. 7,676,538 entitled "Systems and Methods for Application View Transactions," by Tim Potter et al., issued Mar. 9, 2010.

FIELD OF THE INVENTION

The present invention relates to ways of allowing users to interact with an Enterprise application.

BACKGROUND

E-commerce has become a major driving factor in the new economy. To be successful in the long-term, e-commerce will require many companies to engage in cross-enterprise collaborations. To achieve cross-enterprise integration, a company must first integrate its internal applications. Using existing technology and tools, application integration can be an expensive proposition. No integration solution exists that is easy to use, affordable, and based on industry standards. Neither does a solution exist that is based on an industry standard infrastructure, has universal connectivity, is capable of massive scalability, and has accessible business process tools.

Application integration to this point has been very inward-focused. Many existing integration systems have not focused on integrating applications between enterprises. Even when integration solutions were used for cross-enterprise integration, the solutions were still narrowly focused and aimed at vertical markets. This inward focus did little to help companies' external business-to-consumer and business-to-business applications, such as applications that can utilize the Internet to generate revenue and reduce costs. The requirement for Internet-enabled applications led to the rise of the application server market. To date, application servers have primarily been used to host external applications targeted at customers and partners. Application servers are themselves packaged applications that, instead of solving a specific problem, are general-purpose platforms that host vertical solutions.

The first attempts at application integration were primarily focused on low-level implementation details such as the format of the data, the byte ordering between machines, and character encoding. The focus on low-level data formats was necessary because, for the first generation of application integration solutions, there were no widely adopted standards for data encoding that could be deployed across multiple vertical applications.

The traditional approach involved connecting individual systems to, in effect, hardwire the systems together. This approach can be complex, as connecting different systems can require an intimate, low-level knowledge of the proprietary technologies of multiple systems. To remove this complexity, businesses began developing and using adapters.

Adapters are software components that applications can use to programmatically access enterprise data. For example, an adapter can use a Java class to represent enterprise data, and can provide methods that applications can invoke to access the data. When an application invokes an access method, the adapter can execute the method to retrieve the enterprise data.

These integration systems, however, suffer from a lack of standards. Each integration vendor typically provides a proprietary solution for application adapters, message transformation, message formats, message transport, and routing. Not one of these systems to date has achieved significant market share to enable its technologies to become the de-facto standard. This lack of standards has given packaged application vendors little incentive to create adapters to their applications. Further, each of these integration servers has its own proprietary API for constructing adapters, so packaged application vendors cannot leverage the development of an adapter beyond a single integration server. This fragmentation of the integration market has provided little financial incentive for third parties to build adapters.

Application views were developed as a solution to this problem. An application view provides a layer of abstraction between an adapter and Enterprise Information System (EIS) functions exposed by that adapter. Instead of accessing an EIS by directly programming the EIS, a user can simply edit the application views for the adapter, create new application views, or delete obsolete application views. This layer of abstraction, formed by application views, makes it easy for non-programmers to maintain the services and events exposed by the adapter. Each application view is adapter-specific, and defines a set of business functions on the adapter's EIS. Such application views provide a view of the application capabilities exposed by an adapter. Presently, there is no analogous functionality for users of tools such Cajun, a Java 2 Enterprise Edition (J2EE)-based Web services development framework available from BEA Systems Inc. of San Jose, Calif., that can allow tool developers to easily interact with information systems.

BRIEF SUMMARY

An application view tool control can allow users of a software tool to interact with Enterprise applications using simple Java APIs. Such an approach can allow a user who is not an expert in the use of a given Enterprise system to utilize system capabilities in a manner a Java programmer can understand. An application view tool control, hereafter referred to as an application view control, can provide a way for a tool developer to invoke application view services both synchronously and asynchronously, and to subscribe to application view events. In both the service and event cases, the tool developer can use simple Java objects. The developer need not understand XML, or the particular protocol or client API for the Enterprise application, such as an Enterprise Information System (EIS). Systems and methods in accordance with embodiments of the present invention can allow tool developers, or non-EIS experts, to access Enterprise application functionality.

Other features, aspects, and objects of the invention can be obtained from a review of the specification, the figures, and the claims.

DETAILED DESCRIPTION

Systems and methods in accordance with embodiments of the present invention can assist in system integration, such as between a client application and an Enterprise Information System. Such systems can take advantage of application views, and can provide an external software tool with access to application view services and events. Systems in accordance with one embodiment will be described using a Cajun environment, although many such environments can take advantage of aspects of the present invention. Generation tools, such as control wizards, can be used to guide a user through the process of developing an application view control. These tools can automate much of the generation process, generating the necessary objects and files for selections made by the user. For example, meaningful and/or useful classes can be generated to describe request, response, and event payload data structures for services, such as Web services. Schema definitions can be handled automatically, such that any application view defined in terms of an adapter can be imported into, and used within, the external environment. In certain environments, a conversational Java Web services (JWS) instance can be configured to listen for application view events and respond to those events via a callback method.

Figure 1:
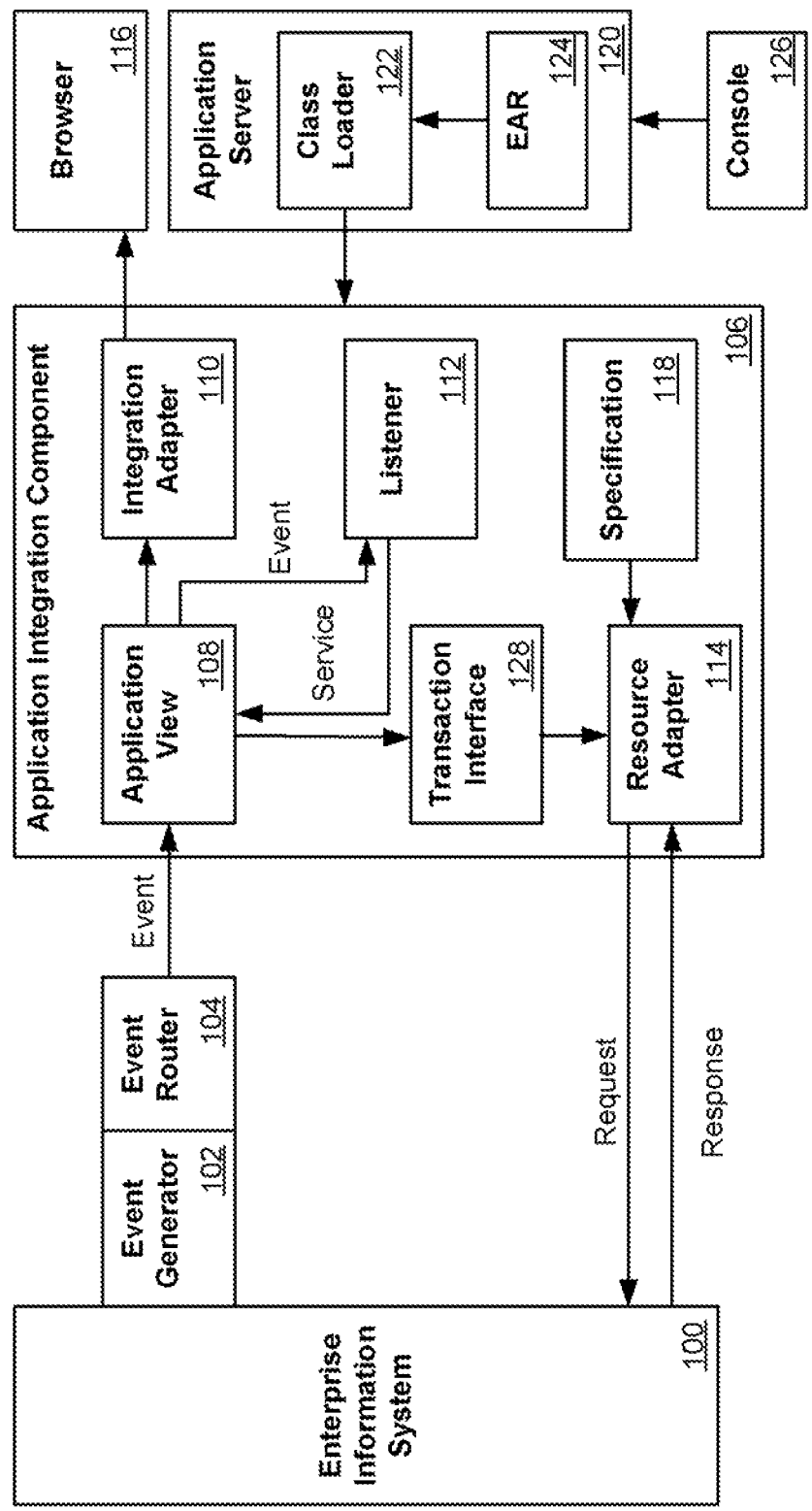
FIG. 1 is a diagram of a system using an application view that can be used in accordance with one embodiment of the present invention.

An exemplary integration system that can take advantage of embodiments in accordance with the present invention is shown in FIG. 1. An integration adapter 110 be used that includes a Web application, allowing a user to browse documents or business programming application interfaces (BAPIs) that are available in an EIS system 100, such as an SAP system, through a Web browser 116 without the Web application. A resource adapter 114 can be used to send requests to, and receive requests from, the EIS 100. The resource adapter 114 can also be used to implement a connector specification 118. An event router 104, which can also be a Web application, can be used to route messages from the EIS 100 to an application view 108 for the application integration component 106.

When an event occurs in the EIS 100, an event generator 102 can detect the event and determine whether anyone should receive this event. To do this, the event generator 102 can check the types of events that have subscriptions, which can be maintained by the event router 104. The event router can create an event object containing pertinent data about the event, and can sends the event object to the event router 104. The event router 104 can send the event object to any application view 108 that is subscribed to the type of event object received from the event generator 102. The application view 108 can receive the event object and notify any listener 112 registered for that type of event. Exemplary listeners can include integration process flow or custom business logic flow. A listener 112 can process the event object and determine whether a service should be invoked in response to the event.

The application view 108 can combine data from the event object with data held by the application view, such as in state variables, and can make a service invocation on a resource adapter 114. The application view can accept the service request and determine which interaction to request on the resource adapter 114. This mapping from service name to adapter interaction can allow the service to be business-centric and not system-function centric. The resource adapter 114 can carry out the request interaction with the EIS 100 and pass the data received from the application view 108. This data can then be viewed, such as through a Web browser 116, through the integration adapter 110.

Figure 2:
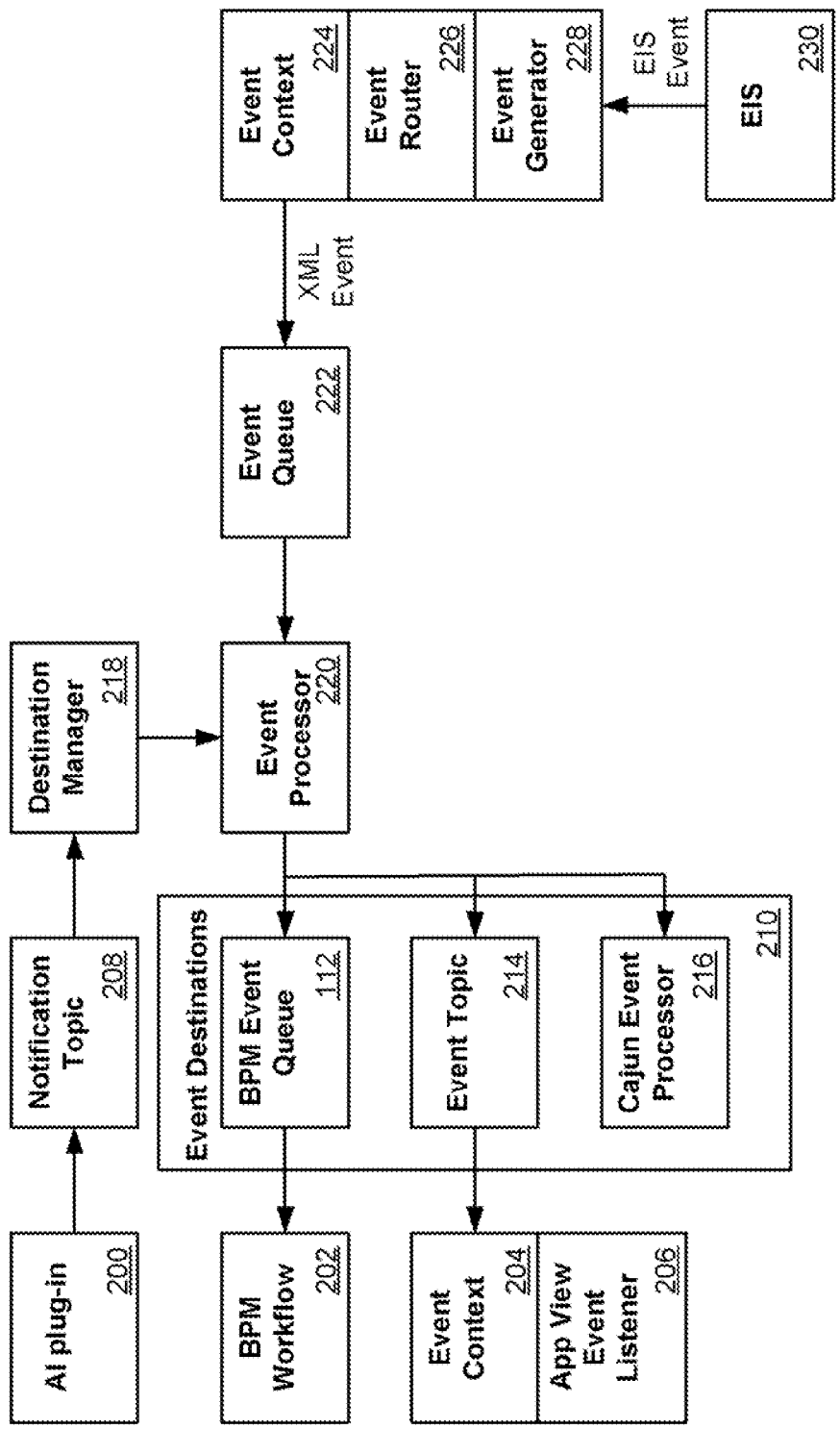
FIG. 2 is a diagram of a system using an application view that can be used in accordance with one embodiment of the present invention.

FIG. 2 shows another system that can take advantage of aspects of the present invention the system capable of high-availability event processing in an application integration engine. In an example of event processing using an integration system, an event occurs in an enterprise information system (EIS) 230. The event data is transferred to an event generator 228 in the resource adapter. The event generator 228 transforms the EIS-specific event data into an XML document and posts an event object, such as an IEvent object, to the event router 226. The event router 226 passes the event object to an event context object 224 for each AI server that is interested in the specific event type. The event context object 224 encapsulates the event object into a JMS object message and sends it to the event queue 222. This queue can be a distributed queue, in that the selected queue exists somewhere in the cluster but uses the same alias.

The event object message is stored in the event queue 222 until it is retrieved for processing by the AI event processor 220, which can process events in a first-in-first-out (FIFO) manner. It may not be enough to send a message to a distributed queue and expect the message to be received by a receiver of that distributed queue. There can be a receiver, or "QueueReceiver", receiving or listening on each physical queue to which an event could be forwarded. Thus, an AI event processor can be deployed on all nodes in a cluster. Multiple event processor deployment can further prevent single points of failure.

The event processor 220 can forward the event to all registered event destinations 210, which in the Figure include a BPM event queue 212, an event topic 114, and a Cajun event processor 216. Event destinations can be added by posting a message to a notification topic 208 for application integration. For example, when an AI plug-in 200 for BPM is deployed, it can send an "addDestination" message to the notification topic to register the BPM event queue 212 as an event destination. The BPM event queue can be a distributed queue. A message published on the notification topic can have cluster-wide visibility. Each node in the cluster can have a singleton event destination manager 218 that is a durable subscriber to this topic. Thus, the message can be published to every event destination manager in the cluster.

The event processor can use a singleton event destination manager 218 to listen for add/remove event destination messages on the notification topic 208 to configure the list of event destinations 210. The event object message can be delivered to all registered event destinations in a single transaction, such as in a single Java Transaction API (JTA) user transaction. If a post to any event destination 210 fails, the event message can be rolled back to the distributed queue 222. The roll back can use the same alias, but can forward the event to a different physical queue in the cluster. If the event processor 220 receives a message such as one that has "getJMSRedelivered( )" true, the post can be tried again. If the retry fails, the message can be sent to an error queue, which can be a distributed queue for failed event and asynchronous service response messages.

If an AI plug-in 200 for BPM is deployed, the plug-in can add the BPM event queue 212 as an event destination during startup so that AI events are passed to a BPM workflow 202 for processing. If there are any registered application view event listeners 206, the event can be sent to an event topic 214 which will use event context 204 to establish a connection with the remote event listener 206 for the application view.

Application Views

An application view can provide significant value to an application integration component. An application view can abstract away much of the complexity in dealing with an application, such as backend EIS system. Application views can also simplify the way in which adapters are accessed. Application views can provide a layer of abstraction, for example, between an adapter and the EIS functions exposed by that adapter. Instead of accessing an EIS by direct programming a user can simply edit an adapter's application views, create new application views, or delete any obsolete application view(s). A layer of abstraction formed by application views can help non-programmers maintain the services and events exposed by an adapter. Each application view can be specific to a single adapter, and can define a set of business functions on that adapter's EIS. After an adapter is created, a Web-based interface for the adapter can be used to define application views.

If an application view is used as a primary user interface for an adapter, a number of features can be included that are not commonly found in existing enterprise application integration technologies. Application views can, for example, use XML as a common language among applications. Service and event definitions can be used to expose application capabilities. XML schemas can be used to define the data for services and events. Bi-directional communication can also be supported in adapters.

An application view can be an integral part of an integration framework when used as an interface object. An application view can provide a view of the application capabilities exposed by an adapter that a user can customize to meet specific needs. A user can tailor an application view, for example, for a specific business purpose. As a result, the application view can provide an effective alternative to the "one size fits all" approach that many applications provide for the design of a client interface. An application view can be defined for only the business or other capabilities that are applicable for a specific purpose. The capabilities can be customized such as by naming, describing, and defining the data requirements.

Figure 3:
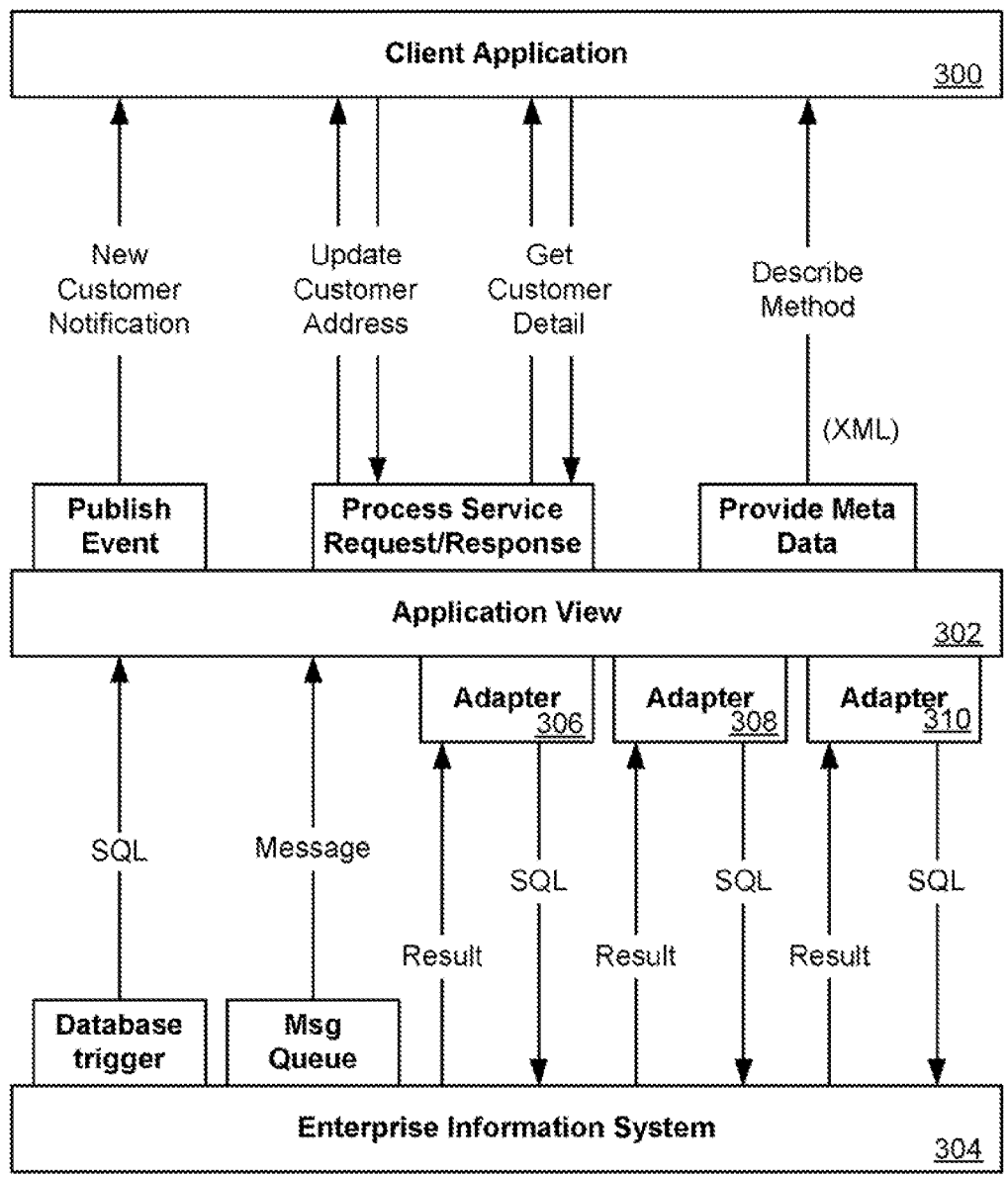
FIG. 3 is a diagram of a system using an application view that can be used in accordance with one embodiment of the present invention.

In one example, shown in FIG. 3, adapters 306, 308, 310 can be developed that allow a client application 300 to communicate with an Enterprise Information System 304 through the use of an application view 302. A developer can begin by coding an adapter that exposes the functionality in the enterprise application that accesses enterprise data. The functionality the adapter exposes could, for example, update records in a database using SQL statements, or could request information from an SAP system using its BAPI or IDOC interfaces. A business analyst, working with the developer, can then define an application view of the adapter using an application view interface.

An application view is an object which can be implemented in one embodiment as a stateless session JavaBean. There can be a Java interface to the application view for the client application. A Java application can be custom coded to use that object, such as by passing XML in and receiving XML back. In addition, a business process management component can be included that allows process engineers to define workflows, and allows application views to be invoked as business services. In a workflow, a callout can be made to an EIS to get information such as a customer's credit record. The fact that the application view is a Java object or enterprise JavaBean can be hidden from the process and designer.

A Web services interface can also be used with an application view. A protocol such as SOAP can be used to invoke a Web service. Another protocol that may be used includes UDDI, a platform-independent, open framework for describing services, discovering businesses, and integrating business services using the Internet. A WSDL protocol can also be used which is an XML format for describing network services. A Web services layer can be provided on top of the application view so that any application view can be invoked as a Web service.

In application integration, new application views can be hot-deployed against an existing EIS through a Web-based interface. An application view is hot-deployed when it is deployed with the system running, without restarting the destination server. A new customer management tool for SAP, for example, can also be defined through a Web browser. A user can also decide whether or not an application view should be deployed persistently. Persistent deployment means the application view can be redeployed whenever the application server is restarted.

Control Wizard

One such software tool for providing access to application view services and events is a control wizard, or application view control wizard. A control wizard can be, for example, a Cajun design-view wizard. One purpose for such a wizard is to guide a user through the process of creating a new instance of an application view control.

Figure 4:
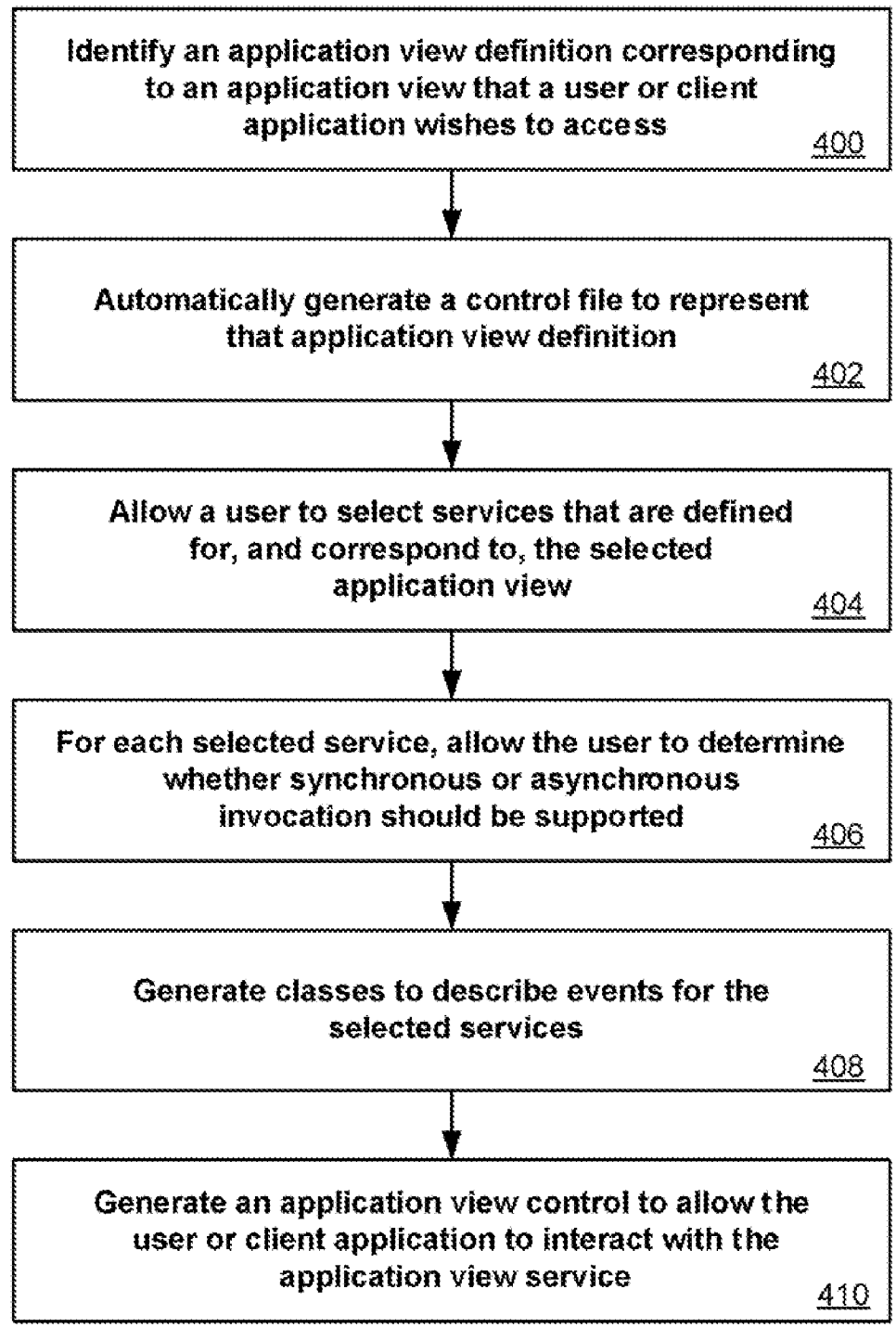
FIG. 4 is a flowchart showing a method that can be used with the systems of FIGS. 1-3.

For example, as shown in the method of FIG. 4, the control wizard can identify an application view definition that corresponds to an application view that a user or client application wishes to access 400. The control wizard can automatically generate a control file to represent the application view definition 402. Application view definition can be stored in, e.g., a computer-readable medium. The control wizard can contain a user interface (UI) component that allows a user to select services that are defined for, and correspond to, the selected application view 404. For each service selected by the user, the control wizard can allow the user to determine whether synchronous or asynchronous invocation, or both, should be supported 406. The control wizard can then generate classes to describe events for the selected services 408. The control wizard can then generate an application view control to allow the user or client application to interact with the application view service using the generated classes and control file 410.

Each run of the control wizard can identify a single application view definition, such as in an integration XML repository, and can generate a single JWI file representing that application view definition. A JWI file is a 'standard' Java file, except that the file contains annotations used to define a control. This process can be referred to as 'importing' an application view, such as for use in the Cajun environment.

A control wizard can be invoked in one embodiment when a user clicks on an 'Application View Control' button on a user interface (UI) toolbar. At the end of the wizard, a new icon can exist on an area of the design view that corresponds to the imported application view and the resultant application view control instance.

The control wizard can display a navigation tree that allows a user to navigate namespaces and application view definitions, similar to the way that an application integration (AI) plug-in does for BPM. Once a user has designated an application view definition as the import source for the control instance, the wizard can allow the user to select any number of services defined for the application view to be generated with asynchronous invocation support.

Since a model such as a Cajun model can be strongly-typed and early-bound, the choice of synchronous/asynchronous invocation can be made at design-time instead of being deferred to runtime. Any service the user chooses to make asynchronous can have both a call-in method and a callback method defined.

A control wizard can also provide a way for a user to 'update' a control instance with any new metadata contained in the application view that was originally imported to create the control instance. The user should be allowed to designate an existing control instance (such as through a pick-list or by name) or a new control instance as the target of the import/JWI generation. This can allow a user to iteratively import an application view to a control instance in the development phase of a Web service. If the user chooses to import to an existing control instance name, then the original contents of the JWI file for that control instance can be overwritten. A backup copy of the JWI can always be kept to prevent the loss of any customizations that may have been made to the JWI contents.

A control wizard can generate a JWI file that contains Java class definitions corresponding to schemas for all services (request/response) and events on the application view that was imported. The generated Java types can be used by the JWS developer when invoking methods and responding to callbacks within the JWS.

At dialog in the control wizard user interface can allow a user to specify the name of the control instance variable in the JWS, and the package name to use when generating the JWI file for the control. It can also allow a user to navigate the namespace/application view hierarchy in the AI repository and select an application view to be imported. Each time the selection changes, the application view and description fields can be updated with the information from the current selection. The description can help the user understand the purpose of the application view that is selected, and thus help the user make the correct decision about whether to import the application view.

A main dialog can also allow a user to specify a 'Run as' identity for a control. Services invoked via a generated JWI file can use the specified user name as their effective identity. The password can be passed to the JWI generator in clear text, but can be encrypted by the JWI generator before placing it into the generated JWI text.

A user can choose services to be imported as asynchronous methods in one embodiment by clicking an 'Async Services . . . ' button. This can pop up in an 'Async Services' dialog. Clicking 'OK' on this dialog can cause the generation of a JWI file for the ApplicationViewControl instance, as well as the creation of the JWS variable for the control.

For the main dialog, a navigation tree can be backed by a Namespace Navigation Facility. Such a facility can allow a user to list application views and namespaces within a namespace. The root of the tree can be populated by listing application views and namespaces in the root namespace, which can be specified by passing the namespaceName as the empty string.

The description can be obtained from the application view selected in the tree. Retrieving the application view's descriptor or metadata about an ApplicationView, such as by using a 'GetApplicationView' command, can return the XML for the application view descriptor. The user can pass an 'objectQName' parameter as the qualified name of the application view. The user can generate this qualified name by composing the node names of all the nodes in the currently selected TreePath. For example, if the currently selected application view were named 'baz', and it lived inside a namespace called 'bar' (represented by a tree node with label 'bar'), and bar lived inside a namespace called 'foo' (represented by a tree node with label 'foo'), then the selected node would be represented by a TreePath object containing the sequence 'foo', 'bar', and 'baz'. The qualified name 'foo.bar.baz' can be created by contatenating together each segment with a period or 'dot'.

To get the description, a user can parse the XML descriptor for the application view. If this proves to be too cumbersome, Java archive (JAR) files such as xmltoolkit.jar and wlai-common.jar can be included to allow the user to use the an ApplicationViewDescriptor object that parses the XML for the user.

A dialog can be 'popped up' from the main wizard dialog when a user clicks 'Async Services . . . ' Such a dialog can allow the user to choose which services on the selected application view should be imported to be asynchronous. The user can choose any services that are to be imported as asynchronous. By default, all services can be imported as synchronous. Synchronous services can be represented by a control method having both input parameters and a non-void return type. Asynchronous services can be represented by a control method having input parameters and a void return type, as well as a callback method having input parameters matching the type that would have been returned if the service was imported as synchronous.

A services list can be populated by getting all the 'service' elements from the descriptor XML, and getting the 'name' attribute value from each. If an IApplicationViewDescriptor object is generated from the XML, such as may require xmltoolkit.jar and wlai-common.jar to be on the classpath, then the user can just call the 'listServiceNames( )' method on the IApplicationViewDescriptor object.

JWI Generation

An application view control can have a JWI generation facility. A servlet can be written to implement an HTTP interface to the JWI generation facility. Such a servlet can accept the information taken from the user during their interaction with the control wizard, and can return the generated JWI text. The servlet can interface with the JWI generation facility in the ApplicationViewControl.

A JWI Generation Servlet can be called, for example, ApplicationViewJWIGeneratorServlet, and can accept parameters such as the following in an HTTP request (both 'get' and 'post' can be supported):

- JWI GEN—Flag to cause JWI generation. This servlet might be used for other purposes, so we use a flag to indicate we want JWI generation. Value is ignored, but for consistency it can be set to the string 'true'.
- PkgName—The name of the package that can appear in the package statement at the top of the generated JWI code. Optional. If given, this can be a valid Java package name (i.e. period separated Java identifiers). May be the empty string.
- ClassName—The name of the class that can be implemented in the generated JWI code. Optional. If given, can be a valid Java class name. If not given, the appViewQName parameter can be used.
- AppViewQName—Fully qualified name of the application view that can act as the source for JWI generation. A period separated name containing a single segment for each level in the namespace hierarchy containing the application view, and a final segment representing the name of the ApplicationView.
- AsyncService-Names—The list of services (by name) that can be generated as async methods in the generated JWI code. Optional. If given, this list can be derived from the list item labels that are selected in the 'Services to Import as Asynchronous' list box in the 'Async Services' dialog. Names can be separated by commas. The servlet can parse them into a List object for use in the makeJwi method.
- RunAsUserID—The effective principal when using the application view (named in the 'appViewQName' parameter) at runtime. Optional. However, it is recommended this be given because an ApplicationView is a protected resource and thus not all principals will be allowed to execute it. Therefore the principal can be specified that does have the correct permissions to execute it. If not given, the server identity in thread can be used.
- RunAsPassword—The password for the above mentioned user ID. Optional. Used only when runAsUserID is given. This can be passed in plain text for simplicity, and can be encrypted with a reversible encryption algorithm before being stored into the generated JWI code.

This servlet can return a MIME type of 'text/plain' when the command is completed successfully. If an error occurs, the error text can be returned as MIME type 'text/html'.

JWI Generation Method

The following signature can be called by an application view JWI generator servlet when a generation request is received. This can be when a user clicks the 'OK' button on the control wizard dialog, for example.

```
public static boolean makeJwi (
    String          pkgName,
    String          className,
    String          appViewQName,
    List            asyncServiceNames,
    String          runAsUserID,
    String          runAsPassword,
    ApplicationViewManager avm,
    SchemaManager   sm,
    NamespaceManager nm,
    PrintWriter     out,
    JwErrors        errors )
    throws Exception
```

The following describes each parameter and where the data for each parameter can be retrieved:

- PkgName—the package name that can appear in the package statement at the top of the generated JWI. pkgName parameter in HttpServletRequest
- ClassName—The name of the interface that can be generated into the JWI. className parameter in HttpServletRequest
- appViewQ-Name—The qualified name of the Application-View that can act as the source for JWI generation. appViewQName parameter in HttpServletRequest.
- asyncService-Names—a list of names of services that the user selected to make async. Parsed from the comma separated list of service names in the asyncService-Names parameter of the HttpServletRequest.
- RunAsUserID—The 'Run As' user name specified by the user. runAsUserID parameter in HttpServletRequest
- RunAsPassword—The password for the 'Run As' user name. runAsPassword parameter of HttpServletRequest. This can be passed in clear text. It can be encrypted before being placed into the generated JWI code.
- sm—A SchemaManager instance. This is an EJB remote interface. It can be obtained by looking it up in JNDI at 'com.client.SchemaManager-Home'. This instance can be cached for the life of the servlet if possible (but its not critical)
- avm—An Application-View Manager instance. This is a local Java object of class 'com.client.-ApplicationView-Manager,' but can require an InitialContext in its constructor. This instance can be cached for the life of the servlet if possible (but its not critical).
- nm—A Namespace-Manager instance. This is an EJB remote interface. It can be obtained by looking it up in JNDI at 'com.client.Namespace-ManagerHome'. This instance can be cached for the life of the servlet if possible (but its not critical).
- out—A PrintWriter instance attached to the HttpServlet-Response. Obtained from the HttpServletResponse object (via response.getWriter( )).
- Errors—A JwErrors instance. Same place as for the Service control.

Namespace Navigation Facility

A servlet interface can be provided to the namespace navigation features of a namespace manager, and the application view retrieval facilities of an application view manager. A 'Ping' command can allow a caller to verify the presence of a running AI engine within the target server and can be indicated by passing a 'PING' parameter in an HTTP query string. Ping can be used to verify that this servlet is alive in the server.

A 'List ApplicationViews' command can be indicated by passing a 'NM_LIST_APPVIEWS' parameter in the HTTP query string, such as:

```
Usage for command: NM_LIST_APPVIEWS
    NM_LIST_APPVIEWS=true
        namespaceName=[namespace name (empty for root namespace)]
    [required] [value optional]
```

This can list objects of application view type in the given namespace. Names may not include the name of the parent namespace. To form a qualified name, the name of the namespace passed in the namespaceName argument can be pre-pended. The command can return a comma-separated list of object names.

A 'List Namespaces' command can be indicated by passing a 'NM_LIST_NAMESPACES' parameter in the HTTP query string, such as:

```
Usage for command: NM_LIST_NAMESPACES
    NM_LIST_NAMESPACES=true
       namespaceName=[namespace name (empty for root namespace)]
          [required] [value optional]
```

This can list objects of Namespace type in the given namespace. Names do not include the name of the parent namespace. To form a qualified name, the name of the namespace passed in the namespaceName argument can be pre-pended.

A 'Get ApplicationView' command can be indicated by passing a 'NM_GET_APPVIEW' parameter in the HTTP query string, such as:

```
Usage for command: NM_GET_APPVIEW
    NM_GET_APPVIEW=true
       objectQName=[qualified name of appview] [required] [value
          required]
```

Schema Type to Java Type Mapping

When importing an application view using a control wizard, the wizard can automatically generate Java types corresponding to the request/response types for services and the payload types for events. These types can be generated based on the schema information associated with the service and events on the application views.

The generated Java type can contain fields for all element definitions at the root level of the schema, such as contained in the named root element definition within the schema. These fields can be derived from simple XML types or from complex XML types. In the case of complex XML types, a new Java type can be generated, and the generated field definition can have the generated Java type for that field. Thus, the generation of Java types from a schema can result in any number of Java class definitions, and thus a nested Java datatype.

All generated types can be inner classes of a container class representing the service request/response or event payload. The container class can be named according to the appropriate naming conventions. This can provide a guaranteed unique namespace for all generated Java types.

For example, given the following schema:

```
<xsd:schema>
  <xsd:element name=@Rows@>
    <xsd:complexType>
      <xsd:element name=@Row@ minOccurs=@0@
          maxOccurs=@unbounded@>
        <xsd:complexType>
          <xsd:element name="StringField"
              type=@xsd:string@/>
```

-continued

```
          <xsd:element name=@IntField@ type=@xsd:int@/>
          <xsd:element name=@DateTimeField@
              type=@xsd:dateTime@/>
        </xsd:complexType>
      </xsd:element>
    </xsd:complexType>
  </xsd:element>
</xsd:schema>
``` and assuming that the schema is associated with the response for the 'GetSomeRows' service. Java types such as the following could be generated:

```
public static class GetSomeRowsResponse implements
java.io.Serializable
{
  public Row[ ] Rows;
  public static class Row implements java.io.Serializable
  {
    public String StringField;
    public int IntField;
    public java.util.Date DateField;
  }
}
```

The outer class can be named for the service and the act that it is the response from the service. The outer class can contain a single field, as the schema contains a single child element, but the field's type is not 'Rows', but rather 'Row[ ]'. The type generation facility can detect parent elements that contain a single child with maxOccurs>1, and can treat the parent element as an array of the child's type.

The Row class can contain fields for all elements in the 'Row' element definition, and can be defined as an inner class of a GetSomeRowsResponse class. This can ensure that the Row class can be named according to the name in the schema without fear of name collisions, which might otherwise be the case if another service used a schema that contained a 'Row' element definition that differs from this one.

Generated Java types can implement java.io.Serializable. This can allow any generated Java type to be serialized to an ObjectOutputStream, and deserialized from an ObjectInputStream. Given the above Java type definitions, in order to retrieve the IntField value from the first Row object in a response object of the above type, a user could write the following code.

```
GetSomeRowsResponse response = < ... code to invoke the service
...>;
int intField = response.Rows[0].IntField;
```

Types

A single top-level type can be generated to represent the schema for a service request. The generated Java type can be named according to the following pattern:
    <service name>Request Another possible naming convention would use the root element name or the schema name. However, both these approaches have their problems. In general, the schema name might contain information about the application view and service for which it was defined. This information may not be not terribly useful or readable in the context of the JWI definition. The root element name may not be guaranteed to be unique among all root element names for all service request/responses and event payload types in the application view. Thus using the root element name could lead to name collisions in the generated JWI file. Because the service name is guaranteed to be unique within an application view, this name can be used to qualify the name of the generated Java type.

A single type can be generated to represent the schema for a service response. The generated Java type can be named according to the following pattern:
    <service name>Response A single type can be generated to represent the schema for an event. The generated Java type can be named according to the following pattern:
    <event name>Event Invoke Service Synchronously Given an application view control instance, such as may be represented by a JWI file with the same name as the application view control instance type name, a JWS developer can invoke an application view service using a single simple Java method taking and/or returning simple Java objects. These objects can represent the data structures required by the service and described by the schemas for request/response on the service. The JWI file can contain sufficient information in any generated types to support the generation of useful JavaDoc pages. Such JavaDoc information can be gleaned from the service names and descriptions, and any documentation elements in the request/response schemas.

When the method representing a synchronous service is invoked, the caller can block until the method returns and the response data is available. Any exceptions thrown from the underlying invocation of the service can be thrown as-is back from the method representing the service. No wrapping of exceptions may be performed by the application view control.

The control wizard can generate a method declaration for each service, not designated as async, on the application view. The generated method can have the following signature:

```
/**
* @jws:av-request xml-map::<xml map definition for Java->request
XML mapping>::
* @jws:av-response xml-map::<xml map definition for response
XML->Java mapping>::
*/
public <return type> <service name>(<input arguments>)
    throws ApplicationViewException, RemoteException
```

Here, <return type> represents a generated Java type corresponding to the <response schema+root element name> for the service, and <input arguments> represents the generated Java type(s) for the <request schema+root element name> for the service. The @jws:av-request and @jws:av-response JavaDoc annotations can be used to control how Java types are mapped to XML for input to the service, and how XML output from the service is mapped to Java types, respectively.

The input argument list can represent the fields of the generated request Javatype. This effectively 'unwraps' the request type, making it easier for the user to invoke the JWI method representing a service because variables only need to be created for the request fields, and not the request itself. This can be particularly useful in cases where the generated request type contains a small number of fields. Without unwrapping, the user could have to create a wrapper object, and then set its few fields before passing the wrapper object into the JWI service method. With unwrapping, the user can simply pass these field values directly into the JWI service method.

Invoke Service Asynchronously

To invoke a service asynchronously, a user can designate the service to be invoked asynchronously, such as at design-time while importing the application view. This can cause the control wizard to generate code for both a call-in and a call-back method in the JWI. The call-in method can have the following signature:

```
/**
* @jws:av-service name="<service name>" async=@true@
* @jws:av-request xml-map::<xml map definition for Java->request
XML mapping>::
*/
public String <service name>(<input arguments>)
    throws ApplicationViewException, RemoteException
```

The @jws:service async="true" JavaDoc annotation can be required to indicate that this method represents an async service invocation. Without this, there may be no way to distinguish an async service method from a service method that returned a single String value. The @jws:av-request JavaDoc annotation can be used to control how Java types are mapped to XML for input to the service.

When a call-in method is invoked, the request can be enqueued, and the call can return without actually servicing the request. Instead, an identifier representing the enqueued request can be returned that allows the correlation of request to response when the response is actually returned, such as by the callback method. This request identifier is a String object. At a later time, such as may be subject to server load, the number of threads processing async requests, and the amount of time required for the EIS to process the request, the response can be made available to the JWS instance via its implementation of the callback method. The callback method can have the following signature and can be defined in the JWI's Callback interface:

```
public interface Callback extends ApplicationViewControl.Callback
{
...
/**
* @jws:av-async-response xml-map::<xml map definition for
response XML->Java mapping >::
*/
public void on<service name>Response(String requestID, <output
arguments>)
    throws Exception;
...
}
```

The requestID parameter to the callback can give the identifier for the request caused this response. The <output argument> parameters can represent the response data from the async service invocation, and can be dependent on the response schema for the service. The @jws.av-async-response JavaDoc annotation can be used to control hor XML output from the service is mapped to Java types.

In order for a JWS instance to receive this callback, it can implement a method with the following signature:

```
public void <control instance name>_on<service name> Response
(String requestID, <output arguments>)
    throws Exception
```

Here, <control instance name> is the name of the variable that holds the reference to the control instance in the JWS file. For example, an application view can be imported based on the database adapter that handles customers (e.g. CustomerMgmt). This can result in the generation of a CustomerMgmt.jwi file. Assuming services to create/update/delete customers named CreateCustomer, UpdateCustomer, DeleteCustomer, respectively, and assuming that the JellyBeans design-time user designated the UpdateCustomer service as async as the user imported the ApplicationView, the JWI file could look like this:

```
import Weblogic.jws.control.ApplicationViewControl;
/**
 * @jws:identity name="CustomerMgmt" user-id="system"
password="<encrypted password>"
 * @jws:namespace xm="http://bea.com/jws/xmap"
 */
public interface CustomerMgmt extends ApplicationViewControl
{
   ... <other classes for create/delete> ...
   public static class UpdateCustomerRequest implements
java.io.Serializable
   {
     public static class Input implements java.io.Serializable
     {
       public String FirstName;
       public String LastName;
       ... <fields to describe updated customer info> ...
     }
   }
   // No type generated for UpdateCustomerResponse because it
holds a single int
   public interface Callback extends
ApplicationViewControl.Callback
   {
     ... <other async response callbacks> ...
     /**
      * @jws:av-async-response xml-map;;
      * <RowsAffected>{RowsAffected}</RowsAffected>;;
      */
     public void onUpdateCustomerResponse (String requestID, int
RowsAffected);
     ... <other event callbacks> ...
   }
   /**
    * @jws:av-service name="UpdateCustomer" async="true"
    * @jws:av-request xml-map;;
    * <Input>
    * <FirstName>{Input.FirstName}</FirstName>
    * <LastName>{Input.LastName}</LastName>
    * ... other field mappings for update info ...
    * </Input>;;
    */
   public String UpdateCustomer (UpdateCustomerRequest.Input
Input)
       throws Exception;
   ... <other service methods> ...
}
And the JWS file could look like this;
import Weblogic.jws.*;
import Weblogic.jws.control.*;
   public class CustomerMgmtService
   {
   /**
    * Our control instance
    * @jws:application-view
    * @jws:control
    */
   private CustomerMgmt custMgmt;
   /**
    * This method begins a JWS conversation. We can only invoke async
services when
    * in a conversation. This is because the conversation is required to
accept the
    * async response.
    *
    * @jws:operation
    * @jws:conversation start
    */
   public String UpdateCustomerAsync(String FirstName, String
           LastName, <fields for updated info>)
     throws Exception
   {
     CustomerMgmt.UpdateCustomerRequest.Input request =
       new CustomerMgmg.UpdateCustomerRequest.Input( );
     request.FirstName = FirstName;
     request.LastName = LastName;
     ... fill in other fields ...
     String requestID =
       custMgmt.UpdateCustomer(request);
     return "invoked service as request>" + requestID + "=" +
     ", will notify you when we're done";
   }
   /**
    * This is a callback for any async service error. This is called when an
async
    * request ends in error. This is necessary because the specific
signature of
    * the async response callback does not, in general, support passing
back error
    * information.
    */
   public void
   custMgmt_onAsyncServiceError(String requestID,
     String errorMessage)
   {
     System.out.println("** In onAsyncServiceError with' +
requestID + ' and ' +
       errorMessage + ");
   }
   /**
    * This is the callback for the >UpdateCustomer= service
    */
   public void
   custMgmt_on UpdateCustomerResponse(String requestID, int
rowsAffected)
   {
     System.out.println("Got async response for request ' + requestID + '."
+
         " We updated" + rowsAffected + " rows@);
   }
}
```

The JWS instance can be in conversational mode before invoking a method representing an async service on an application view control instance. This can be required in certain systems where something is around after the initial request call returns in order to receive the response at a later date. In non-conversational JWS instances, no state may be maintained between method invocations, and thus no state may be available to assist in the processing of the async response. In conversation mode, the response can be routed back to the proper JWS/control instance such that the appropriate state can be used to process the response (i.e. the state, or a descendent of the state, that was present when the async request was made).

The async request can be entered by calling an ApplicationView.invokeServiceAsync( ) method with a ServiceHandle instance, and a specific response queue (CAJUN_ASYNC_RESPONSE_QUEUE). An ApplicationViewBean implementation can attach the ServiceHandle instance representing the JWS instance to the async request, and the async request processor can replicate the ServiceHandle into the async response. The async response can be retrieved by a message driven bean (MDB)

listening on the CAJUN_ASYNC_RESPONSE_QUEUE queue. This MDB can retrieve the ServiceHandle from the response message, and route the response by calling ServiceHandle.invoke( ).

The ability of async responses to survive a server crash/restart can be directly predicated on the ASYNC_REQUEST and WLAI_ASYNC_RESPONSE queues being managed by a JMS server running in persistent mode. The MDB can always be up and listening to the response queue, so as long as the responses arrive/remain on the queue, the response can be routed to the JWS instance that made the request.

A CAJUN_SYNC_RESPONSE_QUEUE can be a distributed queue with multiple physical destinations. When a response is enqueued to the response queue, it can be sent to a single physical destination. The MDB deployment listens on a single physical destination, even though it can establish its connection by specifying a distributed destination. Thus, a single MDB deployment can receive the response and receive it exactly once.

Multiple async requests could be pending for a given JWS conversation instance at any given time. This means that multiple responses may be ready to dispatch to the JWS conversation instance at any given time. An entity EJB locking mechanism can be relied upon to ensure that only one response is dispatched to the entity EJB at a time.

Listen for Event in Existing Conversation

A JWS instance can be in conversation mode in order to listen for and receive events. This means that a JWS method marked as @jws:conversation phase="start" can have been invoked prior to attempting to receive events. To receive events, a JWS instance can indicate its desire to receive events, such as by invoking an enableEventDelivery( ) method on the application view control instance from which it wishes to receive events. After such a call, callback methods corresponding to events of given types can be invoked. To stop receiving events, a JWS instance can invoke the disableEventDelivery( ) method on the ApplicationView control instance.

Events can be delivered via a callback method. The signature of the callback method (within the application view control JWI file) can be of the form:

```
public interface Callback extends ApplicationViewControl.Callback
{
    ... <other callback methods> ...
    /**
     * @jws:av-event xml-map;;<xml map definition for event payload
     XML->Java mapping>;;
     */
    public void on<event name>(<event Java type>)
        throws Exception;
    ... <other callback methods> ...
}
```

The @jws:av-event JavaDoc annotation can be used to control how the event payload XML is mapped to the Java types represented in the callback signature.

The callback method can be implemented in the JWS and can conform to the standard Cajun control callback naming scheme (<control instance name>_<callback name>). So in this case:

```
public void <control instance name>__on<event name>(<event Java type>)
    throws Exception
```

The application view control can manage the subscription for events upon receiving a call to the enableEventDelivery( ) method, and can unsubscribe for events upon receiving a call to the disableEventDelivery( ) method. In general, JWS developers can call enableEventDelivery( ) from a conversation start JWS operation, or from an operation that is guaranteed to be called within a conversation, and can call disableEventDelivery( ) before the conversation ends.

EVENT USAGE EXAMPLE

A JWS developer can use the event listening features in many ways. One typical example would be of a JWS that acts as a 'daemon' service that handles synchronizing data records from one system to another. The JWS can be 'triggered' to start listening for events via a JWS operation, and can stop listening for events via another JWS operation.

Between 'start listening' and 'stop listening' operation calls, a JWS can process any incoming events according to business logic coded in the event callback methods or utility methods on the JWS. Such processing can make use of any state accumulated into the JWS conversation instance. Given this, it can be possible for a JWS implementation to 'parameterize' its processing of events by parameters passed into the 'start listening' operation.

As an example of this type of JWS usage, a use case can be described in which a user wishes to synchronize a customer database in a customer relationship management (CRM) system with multiple legacy customer databases. The legacy customer databases can contain customers meeting different criteria. For the sake of example it can be assumed that LegacyEast only contains customers that live in the eastern part of the United States. LegacyWest only contains customers that live in the western part of the United States. The CRM database contains customers from both the eastern and western parts of the United States.

An example JWS can be intended to synchronize changes in the CRM database into the appropriate legacy database (LegacyEast or LegacyWest). There can be an application view defined for each database and named <db name>AppView. Each application view can have a CreateCustomer, DeleteCustomer, and UpdateCustomer service. Each of these application views can be imported via the application view control wizard, and can have a JWI file representing each one. The JWI class names can match the names of the ApplicationViews (i.e. <db name>AppView).

Given these descriptions, a JWS could be written that looks like the following:

```
import system.jws.*;
import system.jws.control.*;
public class CustomerMgmtService
{
    /**
     * ApplicationView control instance for CRM database
     * @jws:applicationView
     * @jws:control
     */
    private CrmAppView crmAppView;
    /**
```

```
* ApplicationView control instance for LegacyEast database
* @jws:applicationView
* @jws:control
*/
private LegacyEastAppView legacyEastAppView;
/**
* ApplicationView control instance for LegacyWest database
* @jws:applicationView
* @jws:control
*/
private LegacyWestAppView legacyWestAppView;
/**
* Saved state indicating what longitude is considered to be the
* dividing line between the east and west halves of the U.S.
*/
private float m_cutoffLongitude;
/**
* This is our 'start listening' operation. When invoked, we'll start
* processing events from the CRM app view.
*
* @jws conversation phase="start"
*/
public void startListening(float cutoffLongitude)
{
  // Store state information to be used when processing events
  m_cutoffLongitude = cutoffLongitude;
  // Start listening for events
  crmAppView.enableEventDelivery( );
}
/**
* This is our 'stop listening' operation. When invoked, we'll stop
* processing events from the CRM app view.
*
* @jws conversation phase="finish"
*/
public void stopListening( )
{
  // Stop listening for events
  crmAppView.disableEventDelivery( );
}
/**
* This is a callback indicating a new customer has been created in the
* CRM database. We will only get called back on this method after
* a call to startListening(float) has been made, and before a call to
* stopListening( ) has been made.
*/
public void
crmAppView_onCustomerCreated(CrmAppView.-
CustomerCreatedEvent.Customer event)
{
  if (isEast(event))
  {
    createEastCustomer(event);
  }
  else if (isWest(event))
  {
    createWestCustomer(event);
  }
  else
  {
    System.out.println("Customer is not and East or West United States
customer");
  }
}
/**
* Check the newly created customer to see if they live in the east or west
as
* determined by their address, city, state and our stored cutoff longitude.
*/
private boolean isEast(CrmAppView.CustomerCreatedEvent.Customer
event)
{
  // Fetch address information from event and calculate longitude
  float longitude = getLongitude(event.Address, event.City, event.State);
  // Are we east?
  return longitude> m_cutoffLongitude;
}
/**
* Check the newly created customer to see if they live in the east or west
as
* determined by their address, city, state and our stored cutoff longitude.
*/
private boolean isWest(CrmAppView.CustomerCreatedEvent.Customer
event)
{
  // Fetch address information from event and calculate longitude
  float longitude = getLongitude(event.Address, event.City, event.State);
  // Are we west?
  return longitude <= m_cutoffLongitude;
}
/**
* Utility function to calculate longitude of a given address, city
and state.
*/
private float getLongitude(String address, String city, String state)
{
  float longitude = m_cutoffLongitude;
  // May be make use of a general purpose geographical data service via a
  // Web service and ServiceControl instance.
  return longitude;
}
/**
* Create a new customer in the LegacyEast database
*/
private void
createEastCustomer(CrmAppView.CustomerCreatedEvent.Customer
event)
{
  LegacyEastAppView.CreateCustomerRequest.Customer request =
    new LegacyEastAppView.CreateCustomerRequest.Customer( );
  // Fill in the request from the data we got off the event.
  // NOTE: The fields might not have the same names, and may not map
  //    one to one from event to request. If this is the case,
  //    we would write code to transform event field data into the
  //    proper form for the request
  request.FirstName = event.FirstName;
  request.LastName = event.LastName;
  request.Address = event.Address;
  request.City = event.City;
  request.State = event.State;
  ... fill in the rest of the fields ...
  legacyEastAppView.CreateCustomer(request);
}
/**
* Create a new customer in the LegacyWest database
*/
private void createWestCustomer(CrmAppView.CustomerCreatedEvent
event)
{
  LegacyWestAppView.CreateCustomerRequest.Customer request =
    new LegacyWestAppView.CreateCustomerRequest.Customer( );
  // Fill in the request from the data we got off the event.
  // NOTE: The fields might not have the same names, and may not map
  //    one to one from event to request. If this is the case,
  //    we would write code to transform event field data into the
  //    proper form for the request
  request.FirstName = event.FirstName;
  request.LastName = event.LastName;
  request.Address = event.Address;
  request.City = event.City;
  request.State = event.State;
  ... fill in the rest of the fields ...
  legacyWestAppView.CreateCustomer(request);
}
}
```

A user of this JWS could then call 'startListening( )' and pass a longitude somewhere in the middle of the United States. From this point, until no more synchronization is desired, the JWS, or its single conversational instance, could continue to synchronize customers between the CRM database and LegacyEast/LegacyWest databases.

If a JWS developer wants to allow for better parallelism, the developer can define 'startListening( )' to take a range of longitudes. The JWS conversation instance could then only handle the creation of customers only when the customer's longitude fell within the given range. In this way, the JWS user could call startListening with multiple discrete longitude ranges, and get parallel synchronization of customers from multiple JWS conversation instances.

Application views may not explicitly provide for event filtering based on payload content. Each independent JWS conversation instance mentioned above could receive a copy of the event, and they could discard it if it did not meet the filter criteria. The event delivery mechanism for the application view control (ApplicationViewControl) can be directly invocable from an MDB onMessage( ) callback. This can allow an AI event processing MDB to directly dispatch the event to Cajun without the need for an intervening send/publish to another destination.

The event delivery mechanism can store event>watch=information that will control the routing of events off the AI event queue into JWS conversation instances. This event watch info can include a mapping from event type to Cajun ServiceHandle, that can identify the JWS/conversation/control instance identity, and can be persistently stored to a database.

Upon initialization, the event delivery mechanism can read stored event watch information and prepare to route events based on those event watches. As new event watches are added, they too can be persisted to the event watch store, such as to a single table in the database.

This implementation can allow event subscription information and associations with JWS instances to survive server crashes/restarts. A system entity EJB locking mechanism can be relied upon to handle concurrency issues with dispatching multiple events from different nodes in a cluster to the same conversation instance.

JavaDoc Tag Reference
- application-view—Can be used on the JWI class to identify an instance of the ApplicationViewControl.
- av-identity—can be used on the JWI class to identify the application view this control represents and identify the 'Run As' user and password. The 'Run As' can be used to establish the runtime identity under which all services on the ApplicationView will be invoked. If this tag is not specified, defaults can apply.
- name—Attribute of identity tag. Can give the ApplicationView's qualified name (dot-separated qualifiers). If not specified, can default to the fully qualified class name of the JWI interface name. For example, a JWI interface named CustomerMgmt in the EastCoast.Sales package can imply an application view name of 'EastCoast.Sales.CustomerMgmt'.
- user-id—Attribute of identity tag. Gives the 'Run As' user name. If not specified, this can default to the 'default' system identity in the server.
- password—Attribute of identity tag. Gives the 'Run As' user name. Required if user-id is specified, ignored if user-id is not specified, so no default value is applied.
- av-service—Used on the JWI method (call-in only) to indicate that this method represents an ApplicationView service. If not specified, default attributes will apply.
- name—Attribute of av-service. Gives the name of the service on the ApplicationView. If not specified, the method name is used.
- async—Attribute of av-service. Indicates whether this service should have asynchronous behavior. Can default to false. If true, the return type can always be String, and can be the request id of the async request. There can be a corresponding method in the Callback interface called 'on<async method name>Response'. The input arguments to this method represent the response from the async service invocation.
- av-request—Used on a JWI method (call-in only) to specify the xml-map to use when marshalling Java->XML. Can default to null. If null, 'natural' serialization can be used (which means field->element names and containment must match exactly).
- av-response—Used on a JWI method (call-in only) to specify the xml-map to use when unmarshalling XML->Java. Can default to null. If null, 'natural' deserialization is used (which means field->element names and containment must match exactly).
- av-async-response—Used on the async response callback method to specify the xml-map to do XML->Java. Can default to null. If null, 'natural' deserialization can be used (which means field->element names and containment must match exactly).
- av-event—Can be used on an event callback method to specify the xml-map to do XML->Java. Can default to null. If null, 'natural' deserialization is used (which means field->element names and containment must match exactly).

There can be a way to attach non-JMS data to an async request so that a Cajun ServiceHandle instance can be stored. This instance can be used to correlate the async response to the correct Cajun JWS/control instance. Currently, only a hastable of JMS properties can be specified. JMS only allows limited types of data to be stored as properties. Thus a sideband can be used to hold non-JMS data. An additional signature for the ApplicationView.invokeServiceAsync( ) method can be added that includes a user object parameter:

```
public String
invokeServiceAsync(String serviceName,
    IDocument request,
    String responseQueueJNDIName,
    Map jmsPropertyMap,
    Serializable userObject)
throws ApplicationViewException, RemoteException
```

In addition, a user object value can be included in the AsyncServiceRequest object created to represent this request, and can be transferred to the AsyncServiceResponse object that will result from this request. The user object can be retrieved from the AsyncServiceResponse object thus:

public Serializable getUserObject( )

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A method for providing access to an application view service, comprising:
   providing an application control wizard to create an instance of an application view control, including identifying an application view definition for an application view to be accessed, wherein the application view definition defines services for the application view;
generating a servlet to implement an interface to generate a control file, wherein the servlet accepts information from a user and returns configuration text used to generate the control file;
generating the control file from the configuration text representing the application view definition;
selecting services defined for the application view;
determining, by the user, at least one of a synchronous and an asynchronous invocation support for each of the selected services, wherein the synchronous invocation implements a request/response protocol when invoking said each of said selected service, and wherein the asynchronous invocation invokes said each of said selected service while generating the application view service;
generating classes to describe events for the selected services; and
generating the application view control adapted to interact with the application view service using the classes and the control file.

2. A method according to claim 1, wherein:
generating a control file includes generating an annotated Java file.

3. A method according to claim 1, wherein:
generating classes to describe events includes generating classes to describe requests and responses for each of the selected services.

4. A method according to claim 1, further comprising:
generating a schema definition allowing the application view to be imported into an external software environment.

5. A method according to claim 4, further comprising:
generating a Java type that contains fields for all element definitions at a root level of the schema.

6. A method according to claim 4, further comprising:
generated a Java type that is an inner class of a container class representing at least one of a request and response for the selected services.

7. A method according to claim 1, further comprising:
allowing a user to select namespaces and application view definitions from a navigation tree.

8. A method according to clam 1, wherein:
allowing the user to determine at least one of synchronous and asynchronous invocation support for each of the selected services occurs at design-time.

9. A method according to claim 1, further comprising:
allowing the user to update an instance of application view control using metadata contained in the application view.

10. A method according to claim 1, further comprising:
automatically updating when a user changes selected services.

11. A method according to claim 1, further comprising:
generating a Java object capable of invoking an application view service, the Java object representing the data structures required by the service.

12. A method according to claim 1, further comprising:
allowing a Java Web Services (JWS) instance to receive events for a selected service by invoking an enable-delivery method on the application view control instance from which the instance wishes to receive events.

13. A computer system for providing access to an application view service, comprising:
a processor;
means for providing an application control wizard to create an instance of an application view control, including
means for identifying an application view definition for an application view to be accessed, wherein the application view definition defines services for the application view;
means for generating a servlet to implement an interface to generate a control file, wherein the servlet accepts information from a user and returns configuration text used to generate the control file;
means for generating the control file from the configuration text representing the application view definition;
means for selecting services defined for the application view;
means for determining, by the user, at least one of a synchronous and an asynchronous invocation support for each of the selected services, wherein the synchronous invocation implements a request/response protocol when invoking said each of said selected service, and wherein the asynchronous invocation invokes said each of said selected service while generating the application view service;
means for generating classes to describe events for the selected services; and
means for generating the application view control adapted to interact with the application view service using the classes and the control file.

14. A non-transitory computer-readable medium having instructions for providing access to an application view service, said instructions, when executed by one or more processor, cause the one or more processor to execute the steps of:
providing an application control wizard to create an instance of an application view control, including
identifying an application view definition for an application view to be accessed, wherein the application view definition defines services for the application view, and is stored in a non-transitory computer-readable medium;
generating a servlet to implement an interface to generate a control file, wherein the servlet accepts information from a user and returns configuration text used to generate the control file;
generating the control file from the configuration text representing the application view definition;
selecting services defined for the application view;
determining, by the user, at least one of a synchronous and an asynchronous invocation support for each of the selected services, wherein the synchronous invocation implements a request/response protocol when invoking said each of said selected service, and wherein the asynchronous invocation invokes said each of said selected service while generating the application view service;
generating classes to describe events for the selected services; and
generating the application view control adapted to interact with the application view service using the classes and the control file.

15. A computer system comprising: a processor;
object code executed by said processor, said object code configured to:

provide an application control wizard to create an instance of an application view control, including
identify an application view definition for an application view to be accessed, wherein the application view definition defines services for the application view;
generate a servlet to implement an interface to generate a control file, wherein the servlet accepts information from a user and returns configuration text used to generate the control file;
generate the control file from the configuration text representing the application view definition;
selecting services defined for the application view;
determining, by the user, at least one of a synchronous and an asynchronous invocation support for each of the selected services, wherein the synchronous invocation implements a request/response protocol when invoking said each of said selected service, and wherein the asynchronous invocation invokes said each of said selected service while generating the application view service;
generate classes to describe events for the selected services; and
generate the application view control adapted to interact with the application view service using the classes and the control file.

16. A method for providing access to an application view service, comprising:
providing an application control wizard to create an instance of an application view control, including
identifying an application view definition for an application view to be accessed, wherein the application view definition defines services for the application view;
generating a servlet to implement an interface to generate a control file, wherein the servlet accepts information from a user and returns configuration text used to generate the control file;
generating the control file from the configuration text representing the application view definition;
selecting services defined for the application view;
determining, by the user, at least one of a synchronous and an asynchronous invocation support for each of the selected services, wherein the synchronous invocation implements a request/response protocol when invoking said each of said selected service, and wherein the asynchronous invocation invokes said each of said selected service while generating the application view service;
iteratively importing the application view to an application view control instance in the development phase of a Web service;
generating classes to describe events for the selected services; and
generating the application view control adapted to interact with the application view service using the classes and the control file.

17. A method according to claim 16, wherein:
generating a control file includes generating an annotated Java file.

18. A method according to claim 16, wherein:
generating classes to describe events includes generating classes to describe requests and responses for each of the selected services.

19. A method according to claim 16, further comprising:
generating a schema definition allowing the application view to be imported into an external software environment.

20. A method according to claim 19, further comprising:
generating a Java type that contains fields for all element definitions at a root level of the schema.

21. A method according to claim 19, further comprising:
generated a Java type that is an inner class of a container class representing at least one of a request and response for the selected services.

22. A method according to claim 16, further comprising:
allowing a user to select namespaces and application view definitions from a navigation tree.

23. A method according to clam 16, wherein:
allowing the user to determine at least one of synchronous and asynchronous invocation support for each of the selected services occurs at design-time.

24. A method according to claim 16, further comprising:
allowing the user to update an instance of application view control using metadata contained in the application view.

25. A method according to claim 16, further comprising:
automatically updating when a user changes selected services.

26. A method according to claim 16, further comprising:
generating a Java object capable of invoking an application view service, the Java object representing the data structures required by the service.

27. A method according to claim 16, further comprising:
allowing a Java Web Services (JWS) instance to receive events for a selected service by invoking an enable-delivery method on the application view control instance from which the instance wishes to receive events.

28. A computer system for providing access to an application view service, comprising:
a processor;
means for providing an application control wizard to create an instance of an application view control, including
means for identifying an application view definition for an application view to be accessed, wherein the application view definition defines services for the application view;
means for generating a servlet to implement an interface to generate a control file, wherein the servlet accepts information from a user and returns configuration text used to generate the control file;
means for generating the control file from the configuration text representing the application view definition;
means for selecting services defined for the application view;
means for determining, by a user, at least one of a synchronous and an asynchronous invocation support for each of the selected services, wherein the synchronous invocation implements a request/response protocol when invoking said each of said selected service, and wherein the asynchronous invocation invokes said each of said selected service while generating the application view service;
means for iteratively importing the application view to an application view control instance in the development phase of a Web service;
means for generating classes to describe events for the selected services; and
means for generating the application view control adapted to interact with the application view service using the classes and the control file.

29. A non-transitory computer-readable medium having instructions for providing access to an application view service, said instructions, when executed by one or more processor, cause the one or more processor to execute the steps of:
- providing an application control wizard to create an instance of an application view control, including
    - identifying an application view definition for an application view to be accessed, wherein the application view definition defines services for the application view, and is stored in a non-transitory computer-readable medium;
    - generating a servlet to implement an interface to generate a control file, wherein the servlet accepts information from a user and returns configuration text used to generate the control file;
    - generating the control file from the configuration text representing the application view definition;
    - selecting services defined for the application view;
    - determining, by a user, at least one of a synchronous and an asynchronous invocation support for each of the selected services, wherein the synchronous invocation implements a request/response protocol when invoking said each of said selected service, and wherein the asynchronous invocation invokes said each of said selected service while generating the application view service;
- iteratively importing the application view to an application view control instance in the development phase of a Web service;
- iteratively importing an application view to an application view control instance in the development phase of a Web service;
- generating classes to describe events for the selected services; and
- generating the application view control adapted to interact with the application view service using the classes and the control file.

* * * * *